April 10, 1928.

A. DOW 1,665,409

CLUTCH MECHANISM

Filed Dec. 11, 1925　　　4 Sheets-Sheet 1

Inventor
Alexander Dow
By his Attorney F. H. Gibbs

April 10, 1928.

A. DOW 1,665,409

CLUTCH MECHANISM

Filed Dec. 11, 1925  4 Sheets-Sheet 2

Inventor
Alexander Dow
By his Attorney F. H. Gibbs

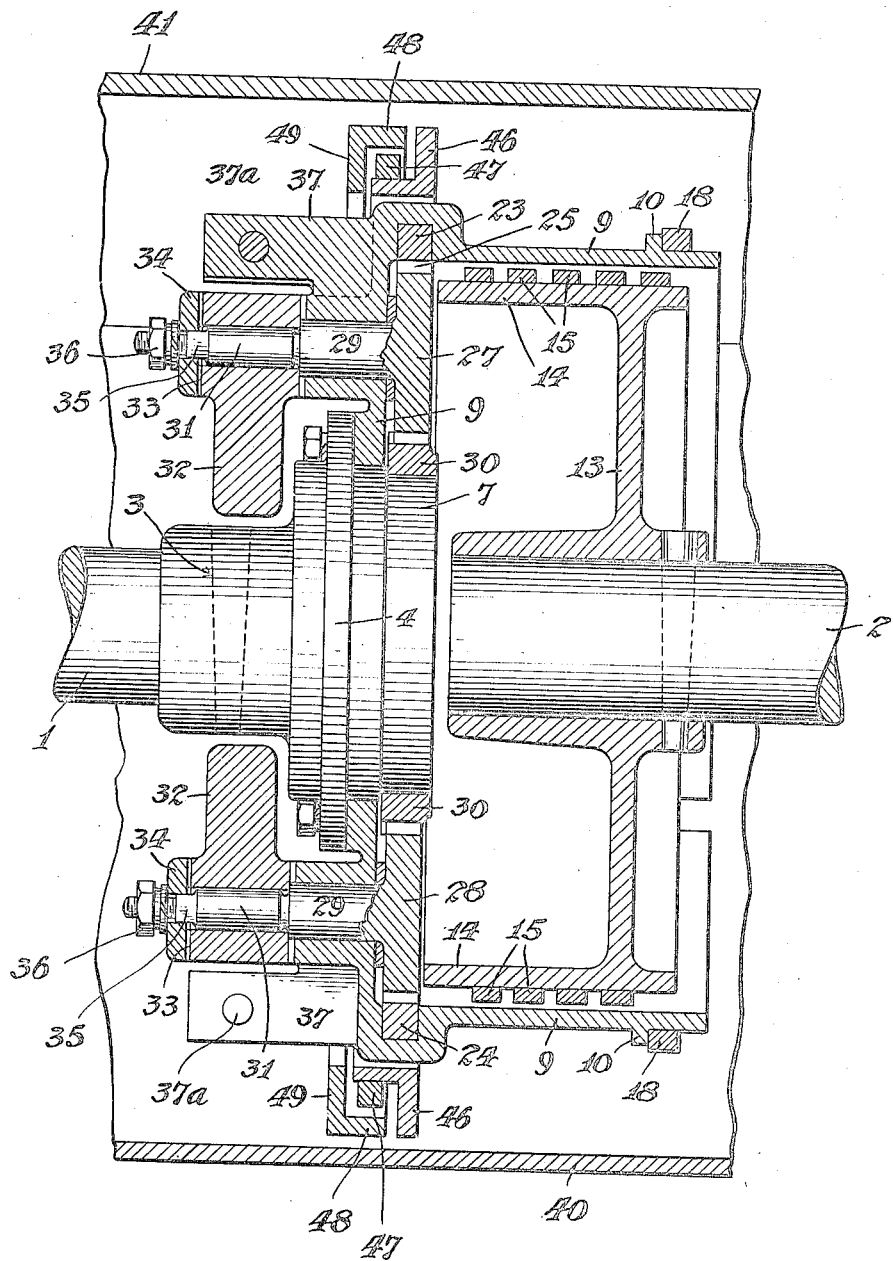

April 10, 1928.  1,665,409

A. DOW

CLUTCH MECHANISM

Filed Dec. 11, 1925  4 Sheets-Sheet 4

Inventor
Alexander Dow
By his Attorney

Patented Apr. 10, 1928.

1,665,409

UNITED STATES PATENT OFFICE.

ALEXANDER DOW, OF NEW YORK, N. Y., ASSIGNOR TO DOW TRANSMISSION CORPORATION, OF NEW YORK, N. Y., A CORPORATION OF NEW YORK.

CLUTCH MECHANISM.

Application filed December 11, 1925. Serial No. 74,804.

This invention relates to an improvement in mechanical clutches and it is an object of the invention to provide novel and improved mechanism whereby a driving shaft is placed in clutched engagement with a driven shaft while the said driving shaft is in motion at any predetermined speed through mechanism actuated by centrifugal force, or is caused to be disengaged therefrom when the speed of the driving shaft diminishes to any desired extent.

Another purpose of my invention is to cause two shafts to be brought to the same speed without shock or jar; to start heavy loads by overcoming their momentum gradually and to thus afford a means by which motors having a torque rising in amount with their speed can be utilized to drive heavy loads once their necessary speed and torque are acquired.

It is also an object of my invention to provide novel and improved mechanism whereby through the action of centrifugal force the members of a clutch for connecting a driving shaft to a driven shaft will be held in positive engagement when the driving shaft rotates in one direction, and will be held in positive disengagement when the driving shaft rotates in the opposite direction.

A further object of my invention is to provide a clutch mechanism of a most powerful character, embraced in a small compass, of light weight, easy to manufacture, and economical in the matter of up-keep.

In my application, Serial No. 725,402, filed July 11, 1924, for a variable speed power transmission my present invention has been illustrated in a transmission mechanism for driving an automobile at different speeds. Although the clutch disclosed is particularly adapted for use in an automobile transmission, it is to be understood that it is applicable to a wide variety of other uses. The present application is a continuation of the above mentioned application as to all matter common to the two applications.

In order that my invention may be better understood, I will now describe the same with reference to the accompanying drawings, wherein.

Figure 1:
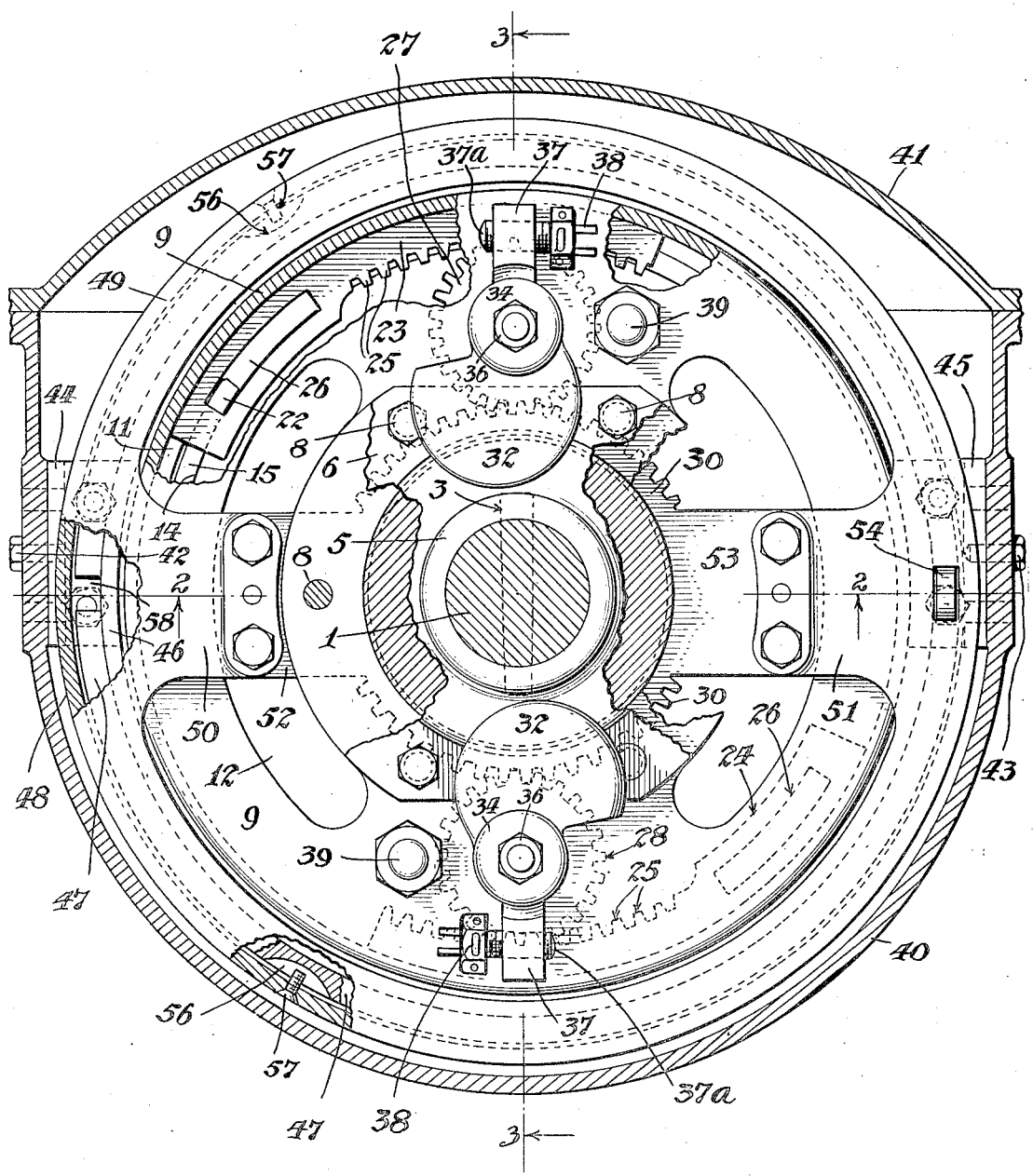
Fig. 1 is a side elevation, partly in section and with some of the parts broken away, of a clutch mechanism constructed in accordance with an embodiment of my invention, and shows the mechanism thereof in a neutral position or when the members of the clutch are at rest.
Figure 2:
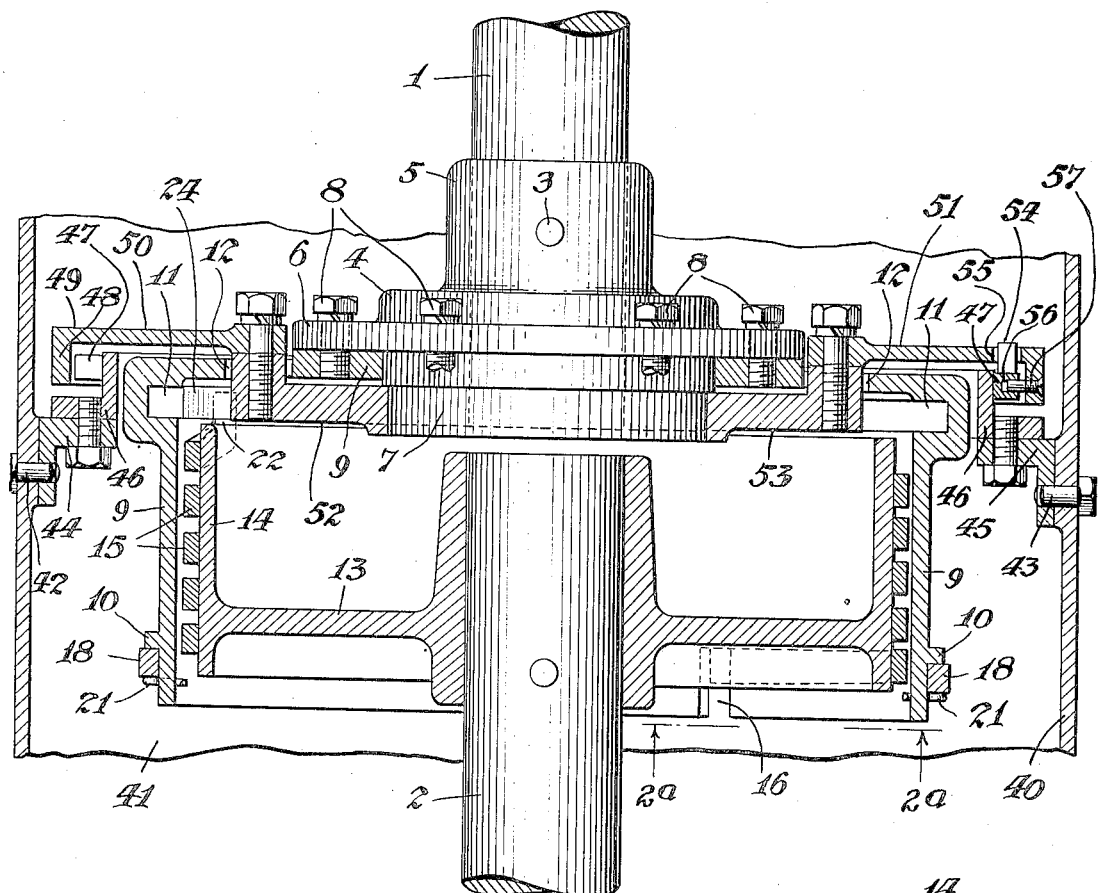
Fig. 2 is a horizontal section of the same taken upon the line 2—2 in Fig. 1, looking in the direction of the arrows.
Figure 2A:
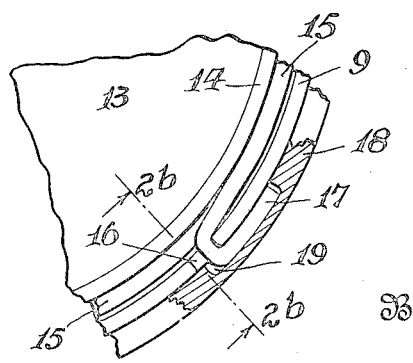
Figure 2B:
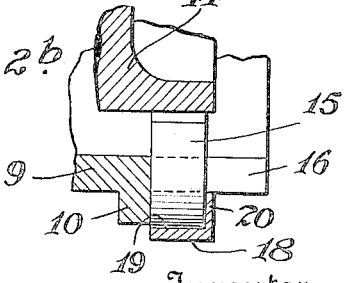
Figure 4:
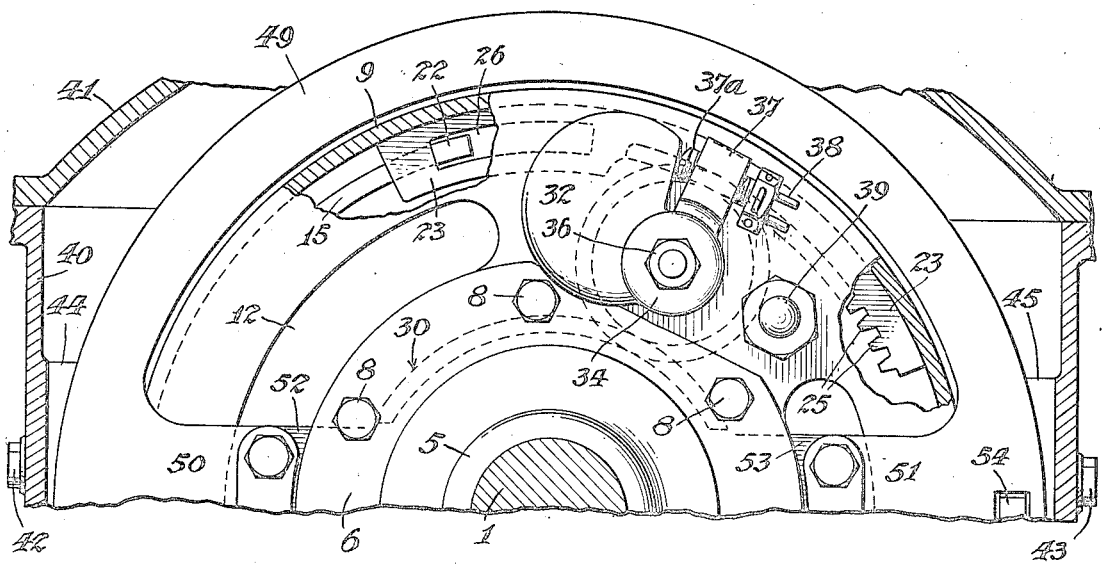
Figure 5:
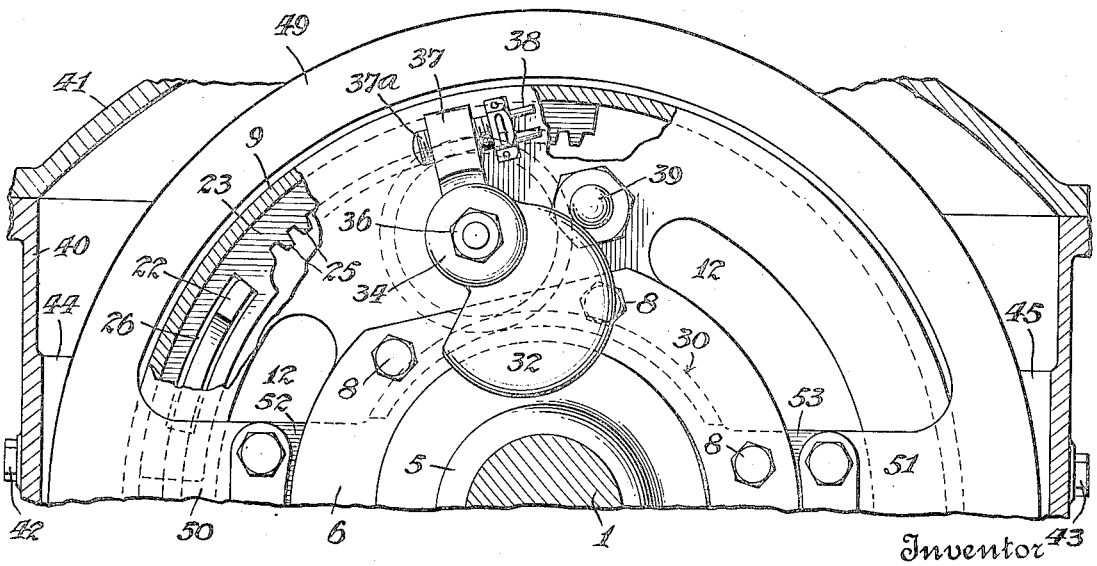

Fig. 2ª is a fragmentary elevation showing details of the clutch mechanism as seen from the line 2ª—2ª in Fig. 2;

Fig. 2ᵇ is a view partly in section showing the construction as seen in the line 2ᵇ—2ᵇ in Fig. 2ª;

Fig. 3 is a vertical section similar to that shown in Fig. 2 and taken on the line 3—3 of Fig. 1 and looking in the direction of the arrows;

Fig. 4 is a partial view similar to Fig. 1 showing the parts of the clutch mechanism in the position they occupy when the clutch is in engagement and driving the driven shaft in a clockwise direction; and Fig. 5 is a view similar to Fig. 4 and showing the parts in the position which they assume when the clutch is disengaged, with one member of the same rotating in an anti-clockwise direction, and with the driven shaft at rest.

Referring to Figs. 1, 2 and 3, 1 is a driving shaft and 2 a driven shaft mounted to rotate in axial alinement in any suitable manner. Securely attached as by the pin 3 to shaft 1 and adapted to be driven by it is the face plate 4 which consists of an external hub 5, a flanged portion 6 and an internal hub 7. Attached, as by bolts 8, to the flanged portion 6 is the clutch housing 9 provided with a circumferential rib 10, an internal annular slot 11 and two arcuate slots 12 passing partly around and through the flange of the housing, the purpose of which will be described. Securely attached to driven shaft 2 is the clutch drum 13 mounted concentrically with clutch housing 9 and having a cylindrical rim 14 with its periphery located within and in close proximity to the interior of the rim of housing 9.

In the annular space between rim 14 of clutch drum 13 and the interior of housing 9 is located with suitable clearance the helical, metallic, spring coil clutch element 15 passing a series of turns about the rim 14 of clutch drum 13. The said coil clutch element 15 is anchored to clutch housing 9 in a manner best shown in Figs. 2ª and 2ᵇ. Referring to these figures it will be seen in Fig. 2ª that coil 15 is bent and passes through the slot 16 in the rim of housing 9 and is then curved backward in the form of a hook 17 about the rim of the housing. Surrounding the rim of the housing and adjacent to the rib 10 thereof is the coil anchor ring 18 provided with an aperture 19 adapted, when ring 18 is in position, to surround the hook 17 of the coil clutch element. It will be seen from Fig. 2ᵇ that this aperture 19 in ring 18 does not pass entirely through the ring but has an external wall 20 which serves to firmly hold hook 17 against displacement in any direction. When the parts are in position ring 18 is held against movement by rib 10 on the one side and cotter pins 21 on the other, shown in Fig. 2.

From the anchor end 17 coil clutch element 15 passes helically a suitable number of turns about clutch drum 14 and is provided at its more remote end with a bent right-angled portion 22 which projects within the plane of internal slot 11 of the clutch housing 9 as best shown in Fig. 2.

Arranged to slide freely in annular slot 11 are the two opposed arcuate racks 23 and 24 formed with gear teeth 25 and constructed with a slot 26 adapted to receive the bent end 22 of coil clutch element 15. Slots 26 in racks 23 and 24 are of a length considerably greater than the width of the bent end 22 of the coil clutch element for reasons which will hereafter be explained.

Referring to Fig. 3, in toothed engagement with teeth 25 of racks 23 and 24 are the two diametrically opposed spur gears 27 and 28. These two gears are mounted in the same manner, and although only one of them is required to operate and tension the end of the coil clutch element of the clutch, the second spur gear is diametrically introduced in order that the mechanism of the clutch may remain at all times in perfect balance. Each of the gears 27 and 28 has formed integrally with it the shaft 29 constructed to rock freely in a journal in housing 9. Spur gears 27 and 28 are further also in toothed engagement with the central segmental gear 30 mounted to rock freely on hub 7 of face plate 4 attached to driving shaft 1. The purpose of the segmental gear 30 is to cause gears 27 and 28, with their accompanying parts, to partake at all times of the same movement, and it also has an additional function which will be further described. Gear shafts 29 are reduced at 31 to receive weight members 32 shown best in elevation in Figs. 1, 4 and 5 and in section in Fig. 3. These weight members are constructed with radial serrations 33 upon their faces intended to engage similar serrations in the washers 34 which are mounted upon the squared ends 35 of shafts 29. Washers 34 are held in close contact with the weight members 32 by means of nuts 36 and afford a means of adjusting the weight members angularly with reference to gears 27 and 28.

Referring now to Figs. 1, 4 and 5, it will be seen that weight members 32 are adapted to be projected outwardly by centrifugal force, thereby rocking gears 27 and 28 and causing arcuate racks 23 and 24 to be circumferentially impelled within the housing 9. One of these racks being in engagement with the end 22 of the coil clutch element 15 will cause the said coil clutch element to either tighten upon the periphery 14 of clutch drum 13, or be held free therefrom and in contact with the interior of clutch housing 9 dependent upon whether centrifugal force impels the said weight members to the right or to the left of a radial line through the center of the driven shaft.

Projecting from the clutch housing 9 and cast integrally therewith are the two lugs 37 provided with adjusting screws 37ª adapted to act as stops to limit the movement of weight members 32 in one direction as is best shown in Fig. 4. These screws 37ª are arranged to be locked in position by means of the bent cotter pins 38. Studs 39 are securely located in housing 9 and act as stops to check the movement of the weight members in the reverse direction as is best shown in Fig. 5.

Referring now to Fig. 1, let it be assumed that the parts indicated thereon are all at rest. Suppose clutch housing 9 actuated by the driving shaft now commences to rotate in a clockwise direction in this drawing while central segmental gear 30 remains momentarily stationary. As the result of this rotation spur gears 27 and 28 will roll upon the teeth of gear 30 in clockwise rotation and as the speed of housing 9 increases centrifugal force will cause the weight members to move outwardly to the position shown in Fig. 4, thereby tightening the coil clutch element 15 upon rim 14 of the clutch drum 13 in a manner to clutch the same in full engagement. The force with which the coil engages the clutch drum can be varied by the weights of the weight members as well as by adjusting screws 37ª and any unnecessary tension upon the coil can be prevented by the adjustment of the said screws 37ª. When the speed of the driving shaft diminishes below a predetermined point, weight members 32 will return under the elastic action of the coil to the position shown in Fig. 1 and the clutch no longer will be engaged.

If we now consider that the driving shaft rotates housing 9 in a counter-clockwise direction while segmental gear 30 remains for an instant at rest, it is clear that gears 27 and 28 will also roll upon gear 30 in a counter-clockwise direction and the weight members 32 will be projected by centrifugal force in the opposite direction against stops 39 as seen in Fig. 5, and will cause the coil clutch element to remain free from the clutch drum held against the interior of clutch housing 9 regardless of the speed of the clutch housing. Further, weight members 32 will return to the neutral position shown in Fig. 1 when the speed of the housing has diminished to a predetermined amount. This results from the stress in the coil 15 due to the movement of the weights 32 toward the stops 39 as described, as well as from the inertia of the weights.

In order that coil clutch element 15 may not interfere with the rotation of weight members 32 when passing from the position shown in Fig. 4 to the position shown in Fig. 5, the slot 26 in circular rack 23 is somewhat elongated for the reason that during the movement just described rack 23 has a greater circumferential movement than is necessary to tighten or loosen the coil clutch element and hence the slot 26 is lengthened to provide for the additional amount of its movement.

The means which are provided herein to maintain segmental gear 30 momentarily at rest upon the starting of clutch housing 9 in either direction and to permit the same to rotate freely after the movement of clutch housing 9 begins will now be explained.

Referring to Figures 1, 2 and 3, 40 represents a casing containing the clutch mechanism and 41 a suitable cover therefor. Held in position by bolts 42 and 43 are the two angle brackets 44 and 45 adapted to support ring 46 having a right-angle section as best seen in Figs. 2 and 3. In frictional engagement with the exterior of the axial flange of ring 46 is the split friction ring 47 adapted to be rotated thereon in frictional contact. This split friction ring 47 is located within the projecting flange 48 of the ring 49 which has over its greater portion a right-angled section, as best seen in Fig. 3. Referring to Figs. 1 and 2, it will be observed that ring 49 has two oppositely disposed inwardly reaching arms 50 and 51. These arms are attached by bolts shown in Fig. 1 to raised bosses projecting from arms 52 and 53 springing from opposite sides of segmental gear 30. The raised bosses project through the arcuate slots 12 in the housing. From this construction it is clear that ring 49 will partake of any movement of segmental gear 30.

As seen in Fig. 2 split friction ring 47 is provided with a lug 54 entering an aperture 55 in ring 49 so that said friction ring 47 will at all times be driven by ring 49. Friction ring 47 is also provided with a suitable number of slots 56 adapted to receive riveted pins 57 located in ring 49 to prevent axial displacement of the friction ring 47 when driven by ring 49.

In the operation of the mechanism just described, it is obvious that when the clutch members are at rest that friction ring 47 will be in contact with ring 46 and hence upon the commencement of the rotation of clutch housing 9, that ring 49 and hence central segmental gear 30 will encounter a resistance to its rotation to the extent of the friction of ring 47. This friction is determined by the elasticity of the ring and is of such an amount as will cause spur gears 27 and 28 to roll upon central gear 30 in either direction, and hence acts in a manner to initiate their movement to either of the positions shown in Figs. 4 or 5 dependent upon the direction of rotation of the clutch housing 9. The instant that clutch housing 9 acquires a predetermined speed, centrifugal force acting upon friction ring 47 causes the same to open in consequence of the split shown at 58 in Fig. 1 and to no longer be in contact with ring 46 but to be freely rotated by ring 49, and further any unnecessary expansion of ring 47 is prevented by the fact that under these conditions its outward expansion is limited by the axial flange of ring 49.

It is to be understood that while in the foregoing description I have shown my invention as applicable to what may be termed a uni-directional centrifugal clutch mechanism which has various applications in the arts, I do not limit myself thereto, as it will be clear to anyone skilled in the art to which this mechanism belongs, that a clutch of this character is also suitable for producing clutch engagement between a driving and a driven shaft in whatever direction the driving shaft may rotate. Further, I do not wish to be understood as limiting myself to the precise arrangement or conformation of the several parts herein shown in carrying out my invention.

What I claim is:

1. In a clutch mechanism, a rotatable driving member, a clutch element connected to said driving member, a driven member adapted to be engaged by said clutch element, a centrifugal member carried by the driving member for tightening the clutch element and for releasing it from the driven member, and means operative upon starting the rotation of the driving member for giving said centrifugal member an initial movement in a direction determined according to the direction of rotation of the driving member for insuring the setting or the releasing of the clutch element as desired when the centrifugal member is operated by centrifugal force.

2. In a clutch mechanism, a driving member, a driven member, centrifugally controlled mechanism for connecting the driving member to the driven member, and means frictionally controlled according to the direction of rotation of the driving member for actuating said mechanism to connect the driving member to the driven member when the driving member is rotated in one direction and for actuating said mechanism to insure the release of the driving member from the driven member when the driving member is operated in a reverse direction.

3. In a clutch mechanism, a driving member, a driven member, means comprising a clutch element for securing said driving member to the driven member, centrifugal means for operating said clutch element, and control mechanism frictionally controlled according to the direction of rotation of the driving member for controlling said centrifugal means to connect the driving member to the driven member upon rotation of the driving member in one direction and for operating the centrifugal means to insure the release of said clutch element upon rotation of the driving member in a reverse direction.

4. In a clutch mechanism, a driving housing, a driven drum positioned within said housing, means comprising a coil clutch element positioned between said housing and the drum for effecting a driving connection between the drum and the housing, centrifugal means operated upon rotation of the housing for tightening said clutch element upon the drum to connect the housing to said drum and for releasing said clutch element from the drum, and means for controlling said centrifugal means according to the direction of rotation of said housing.

5. In a clutch mechanism for connecting a driving shaft to a driven shaft, a driving member secured to the driving shaft, a coil clutch element secured to said driving member, a driven member secured to the driven shaft and adapted to be engaged by said coil clutch element, centrifugal means carried by the driving member for operating said clutch element to engage the driven member and connect the driving shaft to the driven shaft, and for releasing said clutch element, and means for controlling said centrifugal means according to the direction of rotation of the driving member.

6. In a clutch mechanism for connecting a driving shaft to a driven shaft, a driving member secured to the driving shaft, a coil clutch element secured to said driving member, a driven member secured to the driven shaft and adapted to be engaged by said coil clutch element, centrifugal means carried by the driving member for operating said clutch element to engage the driven member when the driving member is rotated in one direction and for releasing said clutch element to disconnect the driving member from the driven member when the driving member is rotated in a reverse direction, and mechanism frictionally controlled by the driving member for operating said centrifugal means according to the direction of rotation of the driving means.

7. In a clutch mechanism, a driving housing, a drum adapted to be driven by said housing, a coil clutch element having one end thereof secured to said housing and disposed around said drum, a movable rack segment carried by said housing and connected to the opposite end of said coil clutch element, a gear for operating said rack segment to tighten or to release said clutch element and a weight member secured to said gear for operating it by centrifugal force to set the clutch element and connect the housing to the drum when the housing is rotated in one direction and to insure the release of the clutch element when the housing is rotated in a reverse direction.

8. In a clutch mechanism, a driving housing, a drum adapted to be driven by said housing, a coil clutch element having one end thereof secured to said housing and disposed around said drum, a movable rack segment carried by said housing and connected to the opposite end of the coil clutch element, a gear meshing with said rack segment to set or to release said clutch element according to the direction of rotation of the gear, a weight secured to said gear for operating it by centrifugal force upon rotation of said housing, stops for limiting the rotation of said weight in either direction, and friction means mounted on said housing for giving the rack gear and weight an initial rotative movement to insure the setting and releasing of the clutch element in accordance with the direction of rotation of the housing.

9. In a clutch mechanism, a driving housing, a drum adapted to be driven by said housing, a coil clutch element having one end thereof secured to said housing and disposed around said drum, movable rack segments carried by said housing, one of said rack segments being connected to the opposite end of said clutch element, rack gear wheels mounted on said housing for operating said rack segments, a weight member secured to each of said rack gear wheels for operating them by centrifugal force when the housing is rotated, a central gear rotatably mounted on said housing and meshing with said rack gear wheels, and means for insuring the movement of rotation of the weights and rack gear wheels in one direction to set said clutch element when the housing is rotated in a predetermined direction and for insuring the movement of rotation of the weights and rack gear wheels in an opposite direction to release the clutch element when the housing is rotated in a reverse direction.

10. In a clutch mechanism, a driving housing, a driven member adapted to be driven by said housing, a coil clutch element carried by said housing for engaging said driven member, one end of said clutch element having a hook-shaped end projecting through the housing, a ring member secured to said housing and having a portion cut away to receive the end of the clutch element projecting through the housing, and mechanism comprising a movable member connected to the opposite end of the clutch element and operated by centrifugal force for setting the clutch element to connect the housing to the driven member.

11. In a centrifugal clutch, a driving member, a driven member, a clutch element for connecting said driving member to the driven member, means comprising a weight pivotally mounted on said driving member and operated by centrifugal force for controlling said clutch element according to the direction of rotation of the driving member, and means operative upon starting the rotation of the driving member for giving said weight an initial movement of rotation on its pivot in a direction determined according to the direction of rotation of the driving member for insuring the setting or the releasing of the clutch element as desired when the weight is operated by centrifugal force.

12. In a centrifugal clutch, a driving member, a driven member, a clutch element for connecting said driving member to the driven member, means comprising a weight pivotally mounted on said driving member for controlling said clutch element according to the direction of rotation of the driving member, said weight having a neutral position with its center of mass substantially in a radial line of the driving member extending through the pivotal point of the weight, and means operative upon starting the rotation of the driving member for giving said weight an initial movement of rotation on its pivot in a direction determined according to the direction of rotation of the driving member to insure the operating or the releasing of the clutch element as desired when the weight is operated by centrifugal force.

13. In a centrifugal clutch, a driving member, a driven member, a clutch element for connecting the driving member to the driven member, means comprising a weight pivotally mounted on said driving member and operated by centrifugal force for controlling said clutch element according to the direction of rotation of the driving member, said weight being given a movement of rotation in one direction to set the clutch element and a movement of rotation in an opposite direction to insure the release of the clutch element, a stationary member, and mechanism comprising a split friction ring for frictionally engaging said stationary member upon starting the rotation of the driving member to give the weight an initial movement of rotation on its pivot according to the direction of rotation of the driving member and for releasing the frictional engagement with said stationary member when the driving member is being rotated at a relatively rapid rate and the weight is being operated by centrifugal force to operate or release the clutch element as desired.

14. In a centrifugal clutch, a driving member, a driven member, a coil clutch element having one end thereof connected to the driving member and adapted to engage the driven member, mechanism connected to the opposite end of the coil clutch element for setting the clutch element to connect the driving member to the driven member or for releasing the clutch element to permit independent movement of the driving member relative to the driven member, said mechanism comprising a weight pivotally mounted on the driving member, a stationary member, a friction ring for frictionally engaging said stationary member, an inertia member rotatably mounted on the driving member and secured to said friction ring, and connecting means between said inertia member and said weight for giving said weight an initial movement on its pivot in a direction determined according to the direction of rotation of the driving member to insure the setting or the releasing of the clutch element as desired when the weight is operated by centrifugal force.

15. In a clutch mechanism, the combination of driving and driven members; centrifugal clutch means for interconnecting and releasing them; and means carried by one of the members for initially actuating said clutch means, to connect or release said members, according to the direction of rotation.

In witness whereof I have hereunto set my hand.

ALEXANDER DOW.